(12) United States Patent
McBride et al.

(10) Patent No.: US 12,040,457 B2
(45) Date of Patent: Jul. 16, 2024

(54) LITHIUM-ION BATTERY MANAGEMENT SYSTEM (BMS) HAVING DIAGONAL ARRANGEMENT

(71) Applicant: THE NOCO COMPANY, Glenwillow, OH (US)

(72) Inventors: James P. McBride, Phoenix, AZ (US); Matthew Michael Bosway, Gilbert, AZ (US)

(73) Assignee: The Noco Company, Glenwillow, OH (US)

( * ) Notice: Subject to any disclaimer, the term of this patent is extended or adjusted under 35 U.S.C. 154(b) by 429 days.

(21) Appl. No.: 17/594,584

(22) PCT Filed: Apr. 24, 2020

(86) PCT No.: PCT/US2020/029825
§ 371 (c)(1),
(2) Date: Oct. 22, 2021

(87) PCT Pub. No.: WO2020/219888
PCT Pub. Date: Oct. 29, 2020

(65) Prior Publication Data
US 2022/0209307 A1 Jun. 30, 2022

Related U.S. Application Data

(63) Continuation-in-part of application No. 16/564,758, filed on Sep. 9, 2019, now Pat. No. 11,251,507.

(51) Int. Cl.
*H01M 10/42* (2006.01)
*H01M 10/0525* (2010.01)

(52) U.S. Cl.
CPC ..... *H01M 10/425* (2013.01); *H01M 10/4207* (2013.01); *H01M 10/0525* (2013.01)

(58) Field of Classification Search
CPC ........... H01M 10/0525; H01M 10/425; H01M 2010/4271; H01M 10/4207;
(Continued)

(56) References Cited

U.S. PATENT DOCUMENTS

| D327,883 S | 7/1992 | Gloton |
| D328,599 S | 8/1992 | Gloton |

(Continued)

FOREIGN PATENT DOCUMENTS

| CN | 106849287 | 6/2017 |
| JP | 2006-196398 | 7/2006 |

(Continued)

OTHER PUBLICATIONS

IP Australia, Appl. 2023200163, Examination Report No. 1, Dec. 5, 2023.
(Continued)

*Primary Examiner* — Victoria H Lynch
(74) *Attorney, Agent, or Firm* — Jones Day

(57) ABSTRACT

A battery management system (BMS) having a printed circuit board (RGB) with a diagonal arrangement for use in a Li-ion battery, a Li-ion battery having a battery management system (BMS) having a printed circuit board (RGB) with a diagonal arrangement, and a BMS having a printed circuit board with diagonal arrangement method.

36 Claims, 9 Drawing Sheets

Related U.S. Application Data

(60) Provisional application No. 62/839,348, filed on Apr. 26, 2019, provisional application No. 62/892,785, filed on Aug. 28, 2019.

(58) Field of Classification Search
CPC .............. H01M 50/284; H01M 50/519; H05K 1/0203; H05K 1/0265; H05K 1/111; H05K 1/182; H05K 2201/066; H05K 2201/10151; H05K 2201/10166; Y02E 60/10

See application file for complete search history.

(56) References Cited

U.S. PATENT DOCUMENTS

| | | | |
|---|---|---|---|
| D459,706 S | 7/2002 | Ebihara et al. |
| D466,093 S | 11/2002 | Ebihara et al. |
| D471,167 S | 3/2003 | Ebihara et al. |
| D471,524 S | 7/2003 | Ebihara et al. |
| D547,371 S | 7/2007 | Miller |
| D552,098 S | 10/2007 | Nishizawa et al. |
| D637,193 S | 5/2011 | Andre et al. |
| D639,756 S | 6/2011 | Greene, Jr. |
| D642,546 S | 8/2011 | Greene, Jr. |
| D669,478 S | 10/2012 | Lepp et al. |
| D669,479 S | 10/2012 | Lepp et al. |
| D673,921 S | 1/2013 | Ozawa |
| D673,922 S | 1/2013 | Moriai et al. |
| D690,672 S | 10/2013 | Yoshida et al. |
| D734,756 S | 7/2015 | Stone et al. |
| D735,203 S | 7/2015 | Kim et al. |
| D735,204 S | 7/2015 | Kim et al. |
| D736,212 S | 8/2015 | Kang et al. |
| D736,213 S | 8/2015 | Kang et al. |
| D736,216 S | 8/2015 | Kang et al. |
| D739,856 S | 9/2015 | Kang et al. |
| D757,015 S | 5/2016 | Amit et al. |
| D759,022 S | 6/2016 | Beals et al. |
| D772,232 S | 11/2016 | Cho |
| D783,621 S | 4/2017 | Lee et al. |
| D813,182 S | 3/2018 | Imai et al. |
| D814,473 S | 4/2018 | Kadonaga |
| D837,171 S | 1/2019 | Vasoya et al. |
| D848,432 S | 5/2019 | Lim et al. |
| D856,948 S | 8/2019 | Vasoya et al. |
| D864,968 S | 10/2019 | Beals |
| D869,469 S | 12/2019 | Lim |
| D869,470 S | 12/2019 | Lim |
| D872,032 S | 1/2020 | Morelli et al. |
| D872,033 S | 1/2020 | Morelli et al. |
| D893,439 S | 8/2020 | Vasoya et al. |
| D902,164 S | 11/2020 | Kondo et al. |
| D909,319 S | 2/2021 | Nordeen |
| D930,601 S | 9/2021 | McBride et al. |
| D937,792 S | 12/2021 | McBride et al. |
| D937,793 S | 12/2021 | McBride et al. |
| D938,374 S | 12/2021 | McBride et al. |
| D944,219 S | 2/2022 | McBride et al. |
| D949,117 S | 4/2022 | McBride et al. |
| D958,762 S | 7/2022 | McBride et al. |
| 2001/0007727 A1 | 7/2001 | Bolstad et al. |
| 2003/0081387 A1 | 5/2003 | Schulz |
| 2006/0097374 A1 | 5/2006 | Egawa |
| 2007/0222417 A1 | 9/2007 | Kim et al. |
| 2009/0268390 A1 | 10/2009 | King et al. |
| 2010/0171462 A1 | 7/2010 | Yang |
| 2010/0330404 A1 | 12/2010 | Nishino et al. |
| 2012/0082875 A1 | 4/2012 | Watanabe et al. |
| 2012/0308849 A1 | 12/2012 | Tortstensson et al. |
| 2014/0079959 A1 | 3/2014 | Nicoson |
| 2014/0233189 A1 | 8/2014 | Shin |
| 2014/0285990 A1 | 9/2014 | Kim et al. |
| 2015/0118523 A1 | 4/2015 | Shrader et al. |
| 2017/0345800 A1 | 11/2017 | Kobayakawa |
| 2018/0281608 A1 | 10/2018 | Albanna et al. |
| 2019/0310321 A1 | 10/2019 | Mi et al. |
| 2022/0209307 A1 | 6/2022 | McBride et al. |

FOREIGN PATENT DOCUMENTS

| | | |
|---|---|---|
| JP | 2013-183539 | 9/2013 |
| JP | 2015-204968 | 11/2015 |
| JP | 2016-170034 | 9/2016 |
| JP | 2016-178629 | 10/2016 |
| JP | 2018-174045 | 11/2018 |
| WO | WO 2011/096863 | 8/2011 |

OTHER PUBLICATIONS

UK Intellectual Property Office, Appl. GB2312131.2, Combined Search and Examination Report, Oct. 11, 2023.

European Patent Office, Appl. 20796165.7, Extended European Search Report, May 3, 2023.

Patent Cooperation Treaty, PCT/US2023/065662, International Search Report and Written Opinion of the International Searching Authority, dated Oct. 13, 2023.

Parthasarathy, et al., "An Overview of Battery Charging Methods, Charge Controllers, and Design of MPPT Controller based on Adruino Nano for Solar Renewable Storage Energy System," International Journal of Engineering Research & Technology, 9(11):430-439; Nov. 2020.

Canadian IP Office, Appl. 3,137,957, Examiner Requisition, Dec. 12, 2022.

Japan Patent Office, Appl. 2021-563366, Office Action, Jan. 17, 2023.

Indian Patent Application No. 202137052345, Examination Report, dated May 31, 2022.

Patent Cooperation Treaty, PCT/US2020/029825, International Search Report and Written Opinion of the International Searching Authority, dated Jul. 23, 2020.

UK Intellectual Property Office, Appl. GB2117046.9, Examination Report, Nov. 9, 2022.

LITHIUM-ION BATTERY MANAGEMENT SYSTEM (BMS) HAVING DIAGONAL ARRANGEMENT

FIELD

The present invention relates to a lithium-ion (Li-ion) Battery Management System (BMS) with a diagonal arrangement, a Li-ion battery having BMS with a diagonal arrangement, and a method of making a BMS with a diagonal arrangement.

The diagonal arrangement provides orienting electronic components, for example, PCB components (e.g. conductive plates, fills, and/or traces), MOSFETs, and/or current sense resistors in a diagonal structure or arrangement to provide a compact structure and arrangement and/or a diagonal heating sinking structure and arrangement to maximize heat sinking capability of the PCB of the BMS.

BACKGROUND

Lithium ion batteries differ from other battery technologies in that they require a Battery Management System (BMS) in order to provide protection. The BMS is typically integrated into the battery and is designed to disconnect the internal battery cells from the external battery terminals in case of over-charge, over-discharge, over-current, short-circuit, and over-temperature.

Since the BMS is arranged in series with the battery cells, the electronic components in the BMS must accommodate the full battery current. In some cases, for example, a vehicle starter battery, this can be a very high current which generates a significant temperature rise. Managing the temperature of the electronic components in the BMS can be challenging due to limited space and cost constraints.

BMS switching is typically performed with MOSFETs. The solution to the difficult problem of managing temperature rise in the MOSFETS has typically been handled in two ways. The first is using surface mount MOSFETs soldered to a Printed Circuit Board (PCB) using copper traces and pads on the PCB for heat sinking. This method is limited in its effectiveness due to the limited thickness of the copper traces and pads that can be fabricated on a PCB in a cost effective manner. The second method is using either surface mount or through-hole MOSFETS with an external heatsink attached using standard methods such as mechanical fasteners and thermal grease. This method is limited in its effectiveness due to the thermal resistance of the connections.

In addition to MOSFETs, the BMS may contain current sense resistors and other power electronic components that have the same thermal challenges as MOSFETs.

In order to carry large currents, a typical BMS uses multiple MOSFETs and/or other electronic components such as current sense resistors arranged in parallel to handle the large battery current. Ideally, each MOSFET or current sense resistor shares an equal portion of the battery current and dissipates a portion of the power resulting temperature rise.

The effectiveness of the heat sinking directly affects the number of MOSFETs required. Adding additional MOSFETs to the BMS to decrease temperature rise increases cost and takes up limited space inside the Li-ion battery.

Therefore a need exists for providing an improved BMS for a Li-ion battery, and adequate thermal management in the Li-ion battery BMS in a cost and space effective manner.

Further, the BMS MOSFETs and current sense resistors may be connected in series with the positive battery terminal or the negative battery terminal. In either case, the components connect between a battery terminal, and the battery cells.

In batteries having smaller physical sizes, it can be a challenge to fit the components on the PCB of the BMS with the required amount of heatsinking, and arrange them such that they share equal portions of the current. If the BMS components do not share current equally, the result can be failure.

The typical method of arranging a PCB of a BMS is to line up the MOSFETs and current sense resistors linearly across the length of the PCB of the BMS. However, often the components will not fit on the PCB of the BMS in a manner to achieve the required amount of heatsinking. One solution is to reduce the heatsinking which is undesirable because it increases the temperature of the electronic components and may lead to failure. Another solution is to re-arrange the electronic components to fit in the allowed space. However, this can lead to unequal current sharing and component failure.

Thus, there exists a need to arrange parallel BMS components to fit in a small space and provide equal current sharing. This can be achieved with a diagonal structure and arrangement of the electronic components and/or diagonal heating sinking arrangement.

SUMMARY

The invention is directed to and improved BMS with a diagonal structure and arrangement, an improved lithium ion battery having an improved BMS with a diagonal structure and arrangement, and a method of making a BMS diagonal arrangement.

The diagonal arrangement provides orienting one or more electronic components, for example BMS components (e.g. PCB conductive plates, fills, and/or traces), MOSFETs, and/or current sense resistors in a diagonal structure or arrangement to provide a compact structure or arrangement and/or a diagonal heating sinking structure or arrangement to provide improved heat sinking capability. For example, the MOSFETs and/or current sense resistors are structured and arranged in a diagonal orientation in the BMS (e.g. diagonal orientation on PCB) and/or the PCB conductive plates, fills, and/or traces (e.g. copper plates, copper fills, and/or copper traces) structured and arranged in a diagonal orientation.

The invention involves orienting the BMS MOSFETs and current sense resistors on a diagonal on the printed circuit board (PCB). This orientation allows the BMS to fit into a space constrained application while maintaining good current sharing between electronic components of the BMS.

The improved BMS can be used with a lithium ion battery (e.g. LCO (Lithium Cobalt Oxide), LTO (Lithium Titanate Oxide), LFP (Lithium Iron Phosphate), LMO (Lithium Manganese Oxide), NMC (Lithium Nickel Manganese Cobalt), and other suitable lithium ion batteries), and the improved lithium ion battery can be any of the above types of lithium ion batteries with the improved BMS with heat sinking.

The PCB of the improved BMS can be provided with multiple electronic components (e.g. MOSFETs and/or current sense resistors) oriented diagonally on one or both sides of the PCB to provide a more compact arrangement. Alternatively, or in addition, the PCB of the improved BMS can be provided with multiple diagonally oriented conductive plates, fills, and/or traces (e.g. multiple diagonal conductive plates arranged parallel relative to each other on the PCB).

The improved BMS with heat sinking comprises one or more electrically conductive plates (e.g. one or more electrically diagonally oriented conductive plates) attached or connected to the Printed Circuit Board (PCB) of the BMS. The electrically conductive plates are used to mount the electronic components (e.g. electronic components of PCB, MOSFETS, and/or current sense resistors) onto the PCB of the BMS. For example, the electrically conductive metal plates are made of copper, copper alloys, plated copper, aluminum, brass, bronze, tin, nickel, silver, or other suitable metals. Specifically, copper plates are made of Grade 110 copper, Grade 101 copper, Grade 145 copper, and other suitable grades of copper.

The electronic components in the BMS are soldered, for example, to the one or more electrically conductive metal plates. The electrically conductive metal plates are connected or attached to electrically conductive metal pads on the PCB by soldering to secure the electrically conductive metal plates to the PCB. For example, the electrically conductive metal plates are soldered at or along edge(s), corner(s), and/or lower surface(s) in order to provide electrical connection to the BMS control electronics. For example, the electrically conductive metal plates can be soldered underneath using solder paste and reflow soldering techniques. Mechanical fasteners may also be used as required to provide additional mechanical strength to withstand vibration and shock. The electrically conductive metal pads, for example, can be 1 oz (ounce) or 2 oz (ounce) copper, but can be thicker or thinner depending on a particular design or application. Copper thickness on the PCT is specified in weight (i.e. the thickness of the electrically conductive metal pads is defined at the weight of copper in ounces that can cover one (1) square foot of the PCT area). The electrically conductive metal pads can comprise a single metal layer or multiple metal layers. In some case the BMS PCB can duplicate the PCB electrically conductive metal pads in multiple layers on the PCB, and connect these layers with multiple vias. A via is a drilled and plated hole between layers. The vias provide electrical and thermal conductivity between layers. This provides additional heat spreading and heat sinking to improve thermal performance. Further, the electrically conductive metal pads can be provided with one or more layers of metal plates located between the electrically conductive metal pads and electrically conductive metal plates to enhance heat sinking. The electrically conductive metal pads can be connected (e.g. via traces) to one or more components and/or circuits on the PCB of the BMS, or can be electrically isolated on the PCB The electrically conductive metal plates are sized as required to allow sufficient room to solder the electronic components, and to maintain the temperature rise of the electronic components of the BMS within their specified operating limits.

The electrically conductive metal plates are located as required to fit inside the battery, and to provide for equal current sharing between parallel electronic components. For example, the electrically conductive metal plates may be 1/16 or 1/8 inch thick, or may be thicker or thinner depending on the thermal requirements of the BMS. Further, the electrically conductive metal plates can have a specific shape (e.g. rectangle, square, L-shaped, triangle, round, arc, symbol).

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein two or more of the BMS electronic components bridge a same gap between the at least a pair of electrically conductive metal plates.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the one or more electrically conductive metal pads etched from a continuous copper sheet laminated onto the PCB substrate (e.g. FR4).

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the one or more electrically conductive metal pads are located on the PCB so that corners of the two or more electrically conductive metal plates connect with the one or more electrically conductive metal pads to secure the two or more electrically conductive metal plates to the PCB.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series, and wherein multiple MOSFETS are connected between the two or more electrically conductive metal plates.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series, and wherein multiple MOSFETS are connected between the two or more electrically conductive metal plates, wherein additional multiple MOSFETS are connected between another two or more electrically conductive metal plates.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein multiple current sense resistors are connected between the two or more electrically conductive metal plates The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series, and wherein multiple MOSFETS are connected between the two or more electrically conductive metal plates, wherein multiple current sense resistors are connect between another two or more electrically conductive metal plates.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series, wherein the two or more electrically conductive metal plates comprises a first electrically conductive metal plate, a second electrically conductive metal plate, a third electrically conductive metal plate, and a fourth electrically conductive metal plate, and wherein one or more MOSFETS are connected between the first electrically conductive metal plate and the second electrically conductive metal plate, wherein one or more MOSFETS are connected between the second electrically conductive metal plate and the third electrically conductive metal plate, and wherein one or more current sense resistors are connected between the third electrically conductive metal plate and the fourth electrically conductive metal plate.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series, wherein the two or more electrically conductive metal plates comprises a first electrically conductive metal plate, a second electrically conductive metal plate, a third electrically conductive metal plate, and a fourth electrically conductive metal plate, and wherein one or more MOSFETS are connected between the first electrically conductive metal plate and the second electrically conductive metal plate, wherein one or more MOSFETS are connected between the second electrically conductive metal plate and the third electrically conductive metal plate, wherein one or more current sense resistors are connected between the third electrically conductive metal plate and the fourth electrically conductive metal plate, and wherein multiple MOSFETS are connected between the first electrically conductive metal plate and the second electrically conductive metal plate, wherein multiple MOSFETS are connected between the second electrically conductive metal plate and the third electrically conductive metal plate, and wherein multiple current sense resistors are connected between the third electrically conductive metal plate and the fourth electrically conductive metal plate.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series, wherein the two or more electrically conductive metal plates comprises a first electrically conductive metal plate, a second electrically conductive metal plate, a third electrically conductive metal plate, and a fourth electrically conductive metal plate, and wherein one or more MOSFETS are connected between the first electrically conductive metal plate and the second electrically conductive metal plate, wherein one or more MOSFETS are connected between the second electrically conductive metal plate and the third electrically conductive metal plate, and wherein one or more current sense resistors are connected between the third electrically conductive metal plate and the fourth electrically conductive metal plate, further comprising a negative battery terminal connected to the first electrically conductive metal plate.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series, wherein the two or more electrically conductive metal plates comprises a first electrically conductive metal plate, a second electrically conductive metal plate, a third electrically conductive metal plate, and a fourth electrically conductive metal plate, and wherein one or more MOSFETS are connected between the first electrically conductive metal plate and the second electrically conductive metal plate, wherein one or more MOSFETS are connected between the second electrically conductive metal plate and the third electrically conductive metal plate, and wherein one or more current sense resistors are connected between the third electrically conductive metal plate and the fourth electrically conductive metal plate, further comprising a negative battery terminal connected to the first electrically conductive metal plate, and, further comprising a positive battery terminal connected to the PCB.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series, wherein the two or more electrically conductive metal plates comprises a first electrically conductive metal plate, a second electrically conductive metal plate, a third electrically conductive metal plate, and a fourth electrically conductive metal plate, and wherein one or more MOSFETS are connected between the first electrically conductive metal plate and the second electrically conductive metal plate, wherein one or more MOSFETS are connected between the second electrically conductive metal plate and the third electrically conductive metal plate, and wherein one or more current sense resistors are connected between the third electrically conductive metal plate and the fourth electrically conductive metal plate, further comprising a negative battery terminal connected to the first electrically conductive metal plate, and, further comprising a positive battery terminal connected to the PCB, and further comprising a negative battery terminal connected to the fourth electrically conductive metal plate.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are arranged in electrical series, wherein the two or more electrically conductive metal plates comprises a first electrically conductive metal plate, a second electrically conductive metal plate, a third electrically conductive metal plate, and a fourth electrically conductive metal plate, and wherein one or more MOSFETS are connected between the first electrically conductive metal plate and the second electrically conductive metal plate, wherein one or more MOSFETS are connected between the second electrically conductive metal plate and the third electrically conductive metal plate, and wherein one or more current sense resistors are connected between the third electrically conductive metal plate and the fourth electrically conductive metal plate, further comprising a negative battery terminal connected to the first electrically conductive metal plate, and, further comprising a positive battery terminal connected to the PCB, further comprising a negative battery terminal connected to the fourth electrically conductive metal plate, and further comprising a BMS controller is electrically connected to the one or more MOSFETS and the one or more current sense resistors.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are soldered to one or more electrically conductive metal pads for securing the two or more electrically conductive metal plates to the PCB.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the two or more electrically conductive metal plates are made of copper plate.

The presently described subject matter is directed to a battery management system (BMS) with heating sinking, the BMS comprising or consisting of: a printed circuit board (PCB) having one or more electrically conductive metal pads; two or more electrically conductive metal plates each connected to the PCB by the one or more electrically conductive metal pads, the two or more electrically conductive metal plates are located adjacent to and spaced apart from each other on the PCB providing an electrically isolating gap between the two or more electrically conductive metal plates; and one or more electronic components of the BMS are electrically connected between the two or more electrically conductive metal plates, wherein the one or more electrically conductive metal pads are made of copper material.

The presently described subject matter is directed to a method of heat sinking a Battery Maintenance System (BMS), the method comprising: applying one or more electrically conductive metal pads to a printed circuit board (PCB); applying two or more electrically conductive metal plates to the printed circuit board by connecting the two or more electrically conductive metal plates to the one or more electrically conductive metal pads; and connecting one or more electronic components of the BMS between the two or more electrically conductive metal plates.

The presently described subject matter is directed to a method of heat sinking a Battery Maintenance System (BMS), the method comprising: applying one or more electrically conductive metal pads to a printed circuit board (PCB); applying two or more electrically conductive metal plates to the printed circuit board by connecting the two or more electrically conductive metal plates to the one or more electrically conductive metal pads; and connecting one or more electronic components of the BMS between the two or more electrically conductive metal plates, wherein the two or more electrically conductive metal plates are arranged in electrical series.

The presently described subject matter is a Li-ion battery, comprising or consisting of: one or more Li-ion battery cells; and a Battery Management System (BMS) connect in electrical series with the one or more Li-ion battery cells, the BMS comprising: a printed circuit board (PCB) having one or more electrically conductive metal pads; two or more electrically conductive metal plates each connected to the PCB by the one or more electrically conductive metal pads, the two or more conductive metal plates spaced apart from each other on the PCB providing an electrically isolating gap between the two or more electrically conductive metal plates; and one or more electronic components of the BMS connected between the electrically conductive metal plates in a manner to bridge the two or more electrically conductive metal plates.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates.

The presently described subject matter is directed to a battery management system (BMS) for use in a rechargeable battery, the BMS comprising or consisting of: a printed circuit board (PCB) having two or more electrically conductive metal plates, the two or more electrically conductive metal plates are located adjacent to and spaced apart from each other on the PCB providing an electrically isolating gap between the two or more electrically conductive metal plates; and multiple electronic components of the BMS electrically connected between the two or more electrically conductive metal plates, the multiple electronic components are arranged along at least one diagonally oriented axis of the PCB relative to an edge of the PCB.

The presently described subject matter is directed to a battery management system (BMS) for use in a rechargeable battery, the BMS comprising or consisting of: a printed circuit board (PCB) having two or more electrically conductive metal plates, the two or more electrically conductive metal plates are located adjacent to and spaced apart from each other on the PCB providing an electrically isolating gap between the two or more electrically conductive metal plates, the two or more electrically conductive metal plates each have a diagonally oriented edge along the electrically isolating gab; and multiple electronic components of the BMS electrically connected between the two or more electrically conductive metal plates, the multiple electronic components are arranged along the diagonally oriented axes of the two or more electrically conductive metal plates and bridging the electrically isolating gab between the two or more electrically conductive plates.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the PCB is provided with multiple electrically conductive metal pads for attaching or anchoring the two or more electrically conductive metal plates to the PCB.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the two or more electrically conductive metal plates are arranged in electrical series.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein two or more of the BMS electronic components bridge a same gap between the two or more electrically conductive metal plates.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the multiple electrically conductive metal pads are formed by etching through a metal layer provided on a substrate of the PCB.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the multiple conductive metal pads are located on the PCB so that corners of the two or more electrically conductive metal plates connect with the multiple metal pads to secure the two or more electrically conductive metal plates to the PCB.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein multiple MOSFETS are connected between the two or more electrically conductive metal plates.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein multiple MOSFETS are connected between the two or more electrically conductive metal plates, and wherein additional multiple MOSFETS are connected between another set of two or more electrically conductive metal plates.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein multiple current sense resistors are connected between the two or more electrically conductive metal plates The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein two or more of the BMS electronic components bridge a same gap between the two or more electrically conductive metal plates, and wherein multiple current sense resistors are connect between another two or more electrically conductive metal plates.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the two or more electrically conductive metal plates comprises a first electrically conductive metal plate, a second electrically conductive metal plate, a third electrically conductive metal plate, and a fourth electrically conductive metal plate, and wherein one or more MOSFETS are connected between the first electrically conductive metal plate and the second electrically conductive metal plate, wherein one or more MOSFETS are connected between the second electrically conductive metal plate and the third electrically conductive metal plate, and wherein one or more current sense resistors are connected between the third electrically conductive metal plate and the fourth electrically conductive metal plate.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the two or more electrically conductive metal plates comprises a first electrically conductive metal plate, a second electrically conductive metal plate, a third electrically conductive metal plate, and a fourth electrically conductive metal plate, and wherein one or more MOSFETS are connected between the first electrically conductive metal plate and the second electrically conductive metal plate, wherein one or more MOSFETS are connected between the second electrically conductive metal plate and the third electrically conductive metal plate, and wherein one or more current sense resistors are connected between the third electrically conductive metal plate and the fourth electrically conductive metal plate, and wherein multiple MOSFETS are connected between the first electrically conductive metal plate and the second electrically conductive metal plate, wherein multiple MOSFETS are connected between the second electrically conductive metal plate and the third electrically conductive metal plate, and wherein multiple current sense resistors are connected between the third electrically conductive metal plate and the fourth electrically conductive metal plate.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, further comprising a negative battery terminal connected to the first electrically conductive metal plate.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, further comprising a negative battery terminal connected to the first electrically conductive metal plate, and further comprising a positive battery terminal connected to the PCB.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, further comprising a negative battery terminal connected to the first electrically conductive metal plate, further comprising a positive battery terminal connected to the PCB, and further comprising a negative battery terminal connected to the fourth electrically conductive metal plate.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, further comprising a negative battery terminal connected to the first electrically conductive metal plate, further comprising a positive battery terminal connected to the PCB, further comprising a negative battery terminal connected to the fourth electrically conductive metal plate, and further comprising a BMS controller is electrically connected to the one or more MOSFETS and the one or more current sense resistors.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the two or more electrically conductive metal plates are soldered to one or more electrically conductive metal pads of the PCB for securing the two or more electrically conductive metal plates to the PCB.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the two or more electrically conductive metal plates are made of copper plate.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the one or more electrically conductive metal pads are made of copper material.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the one or more electrically conductive metal pads are located on the PCB so that edges of the two or more electrically conductive metal plates connect with the one or more electrically conductive metal pads to secure the two or more electrically conductive metal plates to the PCB.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the one or more electrically conductive metal pads are located on the PCB so that the two or more electrically conductive metal plates connect are connected by a lower surface or underneath the two or more electrically conductive metal plates with the one or more electrically conductive metal pads to secure the two or more electrically conductive metal plates to the PCB.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the one or more electrically conductive metal pads comprise multiple electrically conductive metal layers.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, further comprising multiple conductive metal pads connecting the two or more electrically conductive metal plates to the PCB.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein multiple electrically conductive metal pads connect to one or more other electrical components or electrical circuits of the PCB of the BMS.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein multiple electrically conductive metal pads are electrically isolated on the PCB of the BMS and provide only mechanical anchoring of the two or more electrically conductive metal plates.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the two or more diagonally oriented electrically conductive metal plates each have a center axis diagonally oriented relative to edges of the PCB.

The presently described subject matter is directed to a battery management system (BMS) for use in a rechargeable battery, the BMS comprising or consisting of: a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates, wherein the two or more diagonally oriented electrically conductive metal plates each have one or more diagonally oriented edges accommodating the one or more electronic components of the BMS.

The presently described subject matter is directed to a printed circuit board (PCB) for use in a battery management system (BMS) of a rechargeable battery, the PCB comprising: two or more diagonally oriented electrically conductive metal plates connected to the PCB, the two or more electrically conductive metal plates are located adjacent to and spaced apart from each other on the PCB providing an electrically isolating gap between the two or more electrically conductive metal plates.

The presently described subject matter is directed to a printed circuit board (PCB) for use in a battery management system (BMS) of a rechargeable battery, the PCB comprising: two or more electrically conductive metal plates connected to the PCB, the two or more electrically conductive metal plates are located adjacent to and spaced apart from each other on the PCB providing an electrically isolating gap between the two or more electrically conductive metal plates; and multiple electronic components of the BMS electrically connected between the two or more electrically conductive metal plates, the multiple electronic components are arranged along at least one diagonally oriented axis of the PCB relative to an edge of the PCB.

The presently described subject matter is directed to a printed circuit board (PCB) for use in a battery management system (BMS) of a rechargeable battery, the BMS comprising: two or more electrically conductive metal plates connected to the PCB, the two or more electrically conductive metal plates are located adjacent to and spaced apart from each other on the PCB providing an electrically isolating gap between the two or more electrically conductive metal plates, the two or more electrically conductive metal plates each have a diagonally oriented edge along the electrically isolating gab; and multiple electronic components of the BMS electrically connected between the two or more electrically conductive metal plates, the multiple electronic components are arranged along the diagonally oriented axes of the two or more electrically conductive metal plates and bridging the electrically isolating gab between the two or more electrically conductive plates.

The presently described subject matter is directed to a method of making a printed circuit board for use in a battery maintenance system (BMS), the method comprising: applying two or more spaced apart electrically conductive metal plates to a printed circuit board (PCB); and diagonally orienting adjacent and spaced apart respective edges of the two or more electrically conductive metal plates on the PCB.

The presently described subject matter is directed to a method of making a printed circuit board for use in a battery maintenance system (BMS), the method comprising: applying two or more spaced apart electrically conductive metal plates to a printed circuit board (PCB); and diagonally orienting adjacent and spaced apart respective edges of the two or more electrically conductive metal plates on the PCB, further comprising connecting one or more electrical components of the BMS bridging the spaced apart respective edges of the two or more electrically conductive metal plates.

The presently described subject matter is directed to a Li-ion battery, comprising: one or more Li-ion battery cells; and a battery management system (BMS) connect in electrical series with the one or more Li-ion battery cells, the BMS comprising: a printed circuit board (PCB) having two or more spaced apart electrically conductive metal plates, the two or more electrically conductive metal plates having respective diagonally oriented spaced apart edges; and one or more electronic components of the BMS bridging the respective diagonally oriented spaced apart edges.

DETAILED DESCRIPTION

Figure 1:
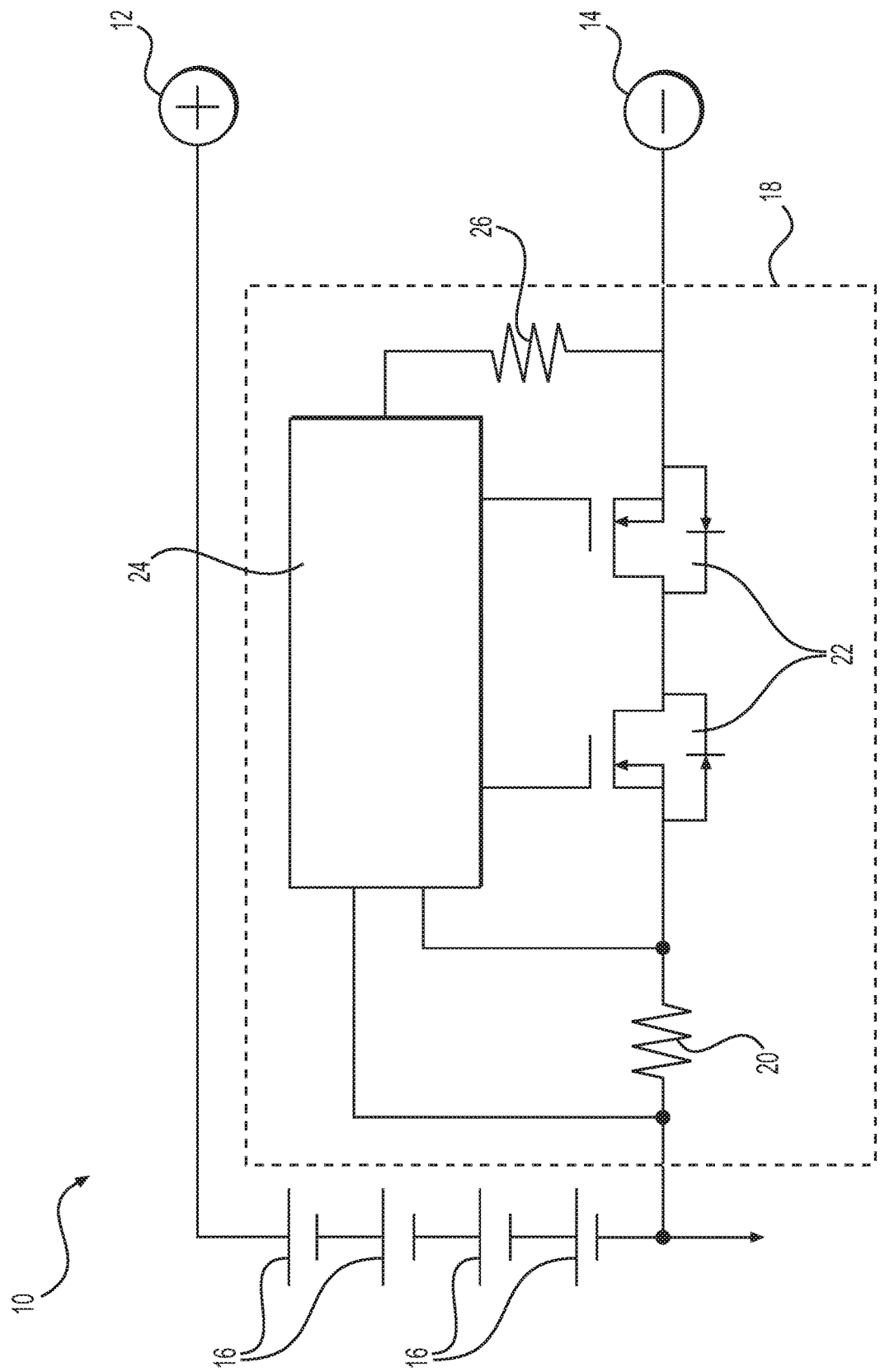
FIG. 1 is a schematic diagram of a lithium ion battery with BMS according to the present invention.

A Li-ion battery 10 comprising a positive (+) battery terminal 12, a negative (−) battery terminal 14, multiple Li-ion battery cells 16 (e.g. four (4) Li-ion battery cells shown), and a Battery Management System (BMS) 18 is shown in FIG. 1. The multiple battery cells 16 are arranged in electrical series with the BMS.

The BMS 18 comprises a current sense resistor 20 in electrical series with multiple MOSFETS 22 (e.g. two (2) MOSFETS shown), and a BMS controller 24. The BMS 18 can optionally include resistor 26. The BMS controller 24 is electrically connected to the electronic components of the BMS as shown.

Figure 2:
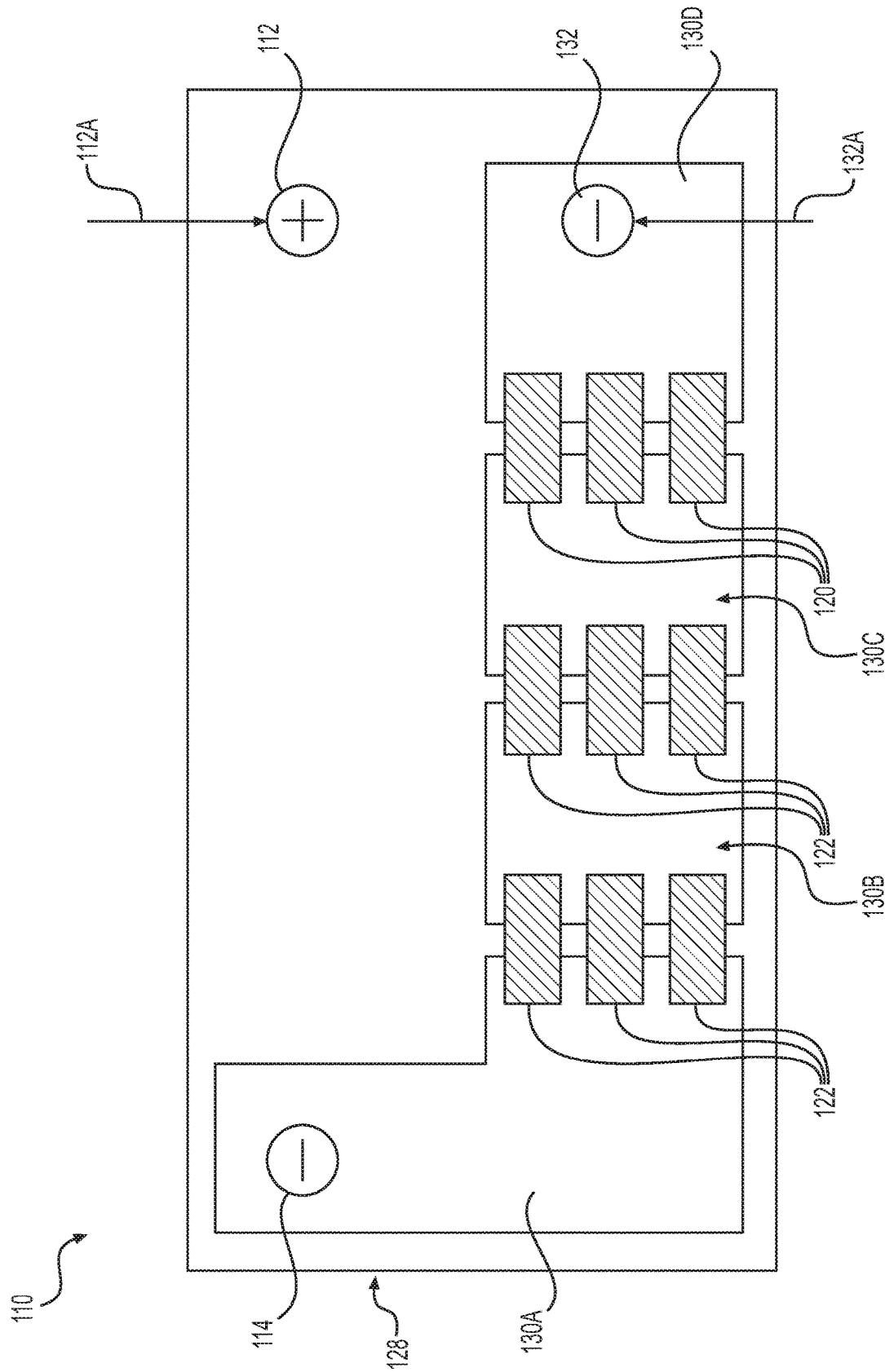
FIG. 2 is a top planar view of a PCB of the BMS with multiple spaced apart copper plates for thermal management according to the present invention.

A Li-ion battery 110 with a heat sinking Printed Circuit Board (PCB) 128 according to the present invention is shown in FIG. 2. The PCB 128 comprises a positive (+) battery terminal 112 having a positive (+) red wire connection 112A, a negative (−) battery terminal 114, a first electrically conductive metal plate 130A, a second electrically conductive metal plate 130B, a third electrically conductive metal plate 130C, a fourth electrically conductive metal plate 130D, a BMS negative (−) terminal 132 having a negative (−) black wire connection 132A, multiple MOSFETS 122 (e.g. six (6) MOSFETS with three (3) MOSFETS arranged in parallel with two (2) sets of the MOSFETS arranged in series as shown), and multiple current sense resistors 120.

The electrically conductive metal plates 130A, 130B, 130C, 130D, for example, are made of electrically conductive metal or other suitable conductive materials or composites (e.g. copper plate, aluminum plate, nickel plate, silver plate, gold plate, metal clad plate, plated metal plate).

The electrically conductive metal plates 130A, 130B, 130C, 130D are oriented and spaced apart from each other when assembled onto the PCB 128. For example, the electrically conductive metal plates 130A, 130B, 130C, 130D are copper plates. Further, the electrically conductive metal plate 130A is L-shaped and the electrically conductive metal plates 130B, 130C, 130D are square-shaped. Alternatively, the electrically conductive metal plates can have other shapes (e.g. rectangular, triangle, round, star, U-shaped, custom shape(s)).

The Li-ion battery 110 can be a LCO (Lithium Cobalt Oxide), LTO (Lithium Titanate Oxide), LFP (Lithium Iron Phosphate), LMO (Lithium Manganese Oxide), or NMC (Lithium Nickel Manganese Cobalt) type Li-ion battery, or other suitable Li-ion battery.

The edges of the electrically conductive metal plates 130A, 130B, 130C, 130D are straight edges, and adjacent electrically conductive metal plates are located and oriented to be parallel edge-to-edge and spaced apart a predetermined distance to provide an electrically isolating gap sized to properly connect with or accommodate the electronic components of the BMS 118 bridging the respective gap and connecting respective pairs of the electrically conductive metal plates 130A, 130B, 130C, 130D. Specifically, the gap between the electrically conductive metal plates 130A and 130B and the gap between conductive metal plates 130B and 130C are sized to properly connect with and accommodate the MOSFETS 122 (FIG. 2), and the gap between the electrically conductive metal plates 130C and 130D are sized to properly connect with and accommodate the current sense resistors 120. Alternatively, the electrically conductive plates can have other shaped edges (e.g. round, curved, saw tooth, extensions, custom shaped edge(s)).

Again, the MOSFETS 122 and current sense resistors connect between respective pairs of the electrically conductive metal plates 130A, 130B, 130C, 130D. The gaps located between the electrically conductive metal plates 130A, 130B, 130C, 130D are electrically isolating gaps to prevent electrical current flowing directly between the electrically conductive metal plates 130A, 130B, 130C, 130D, and prevent electrically shorting therebetween. It is note that the substrate of the PCB 128 is made of electrically insulating material preventing electrical current passing therethrough. Further, the gaps are essentially electrically isolating air gaps located between the edges of the electrically conductive metal plates 130A, 130B, 130C, 130D.

The electrically conductive metal plates 130A, 130B, 130C, 130D can be made of copper, copper alloys, plated copper, aluminum, brass, bronze, tin, nickel, silver, or other suitable metals. Specifically, copper plates are made of Grade 110 copper, Grade 101 copper, Grade 145 copper, and other suitable grades of copper.

Figure 3:
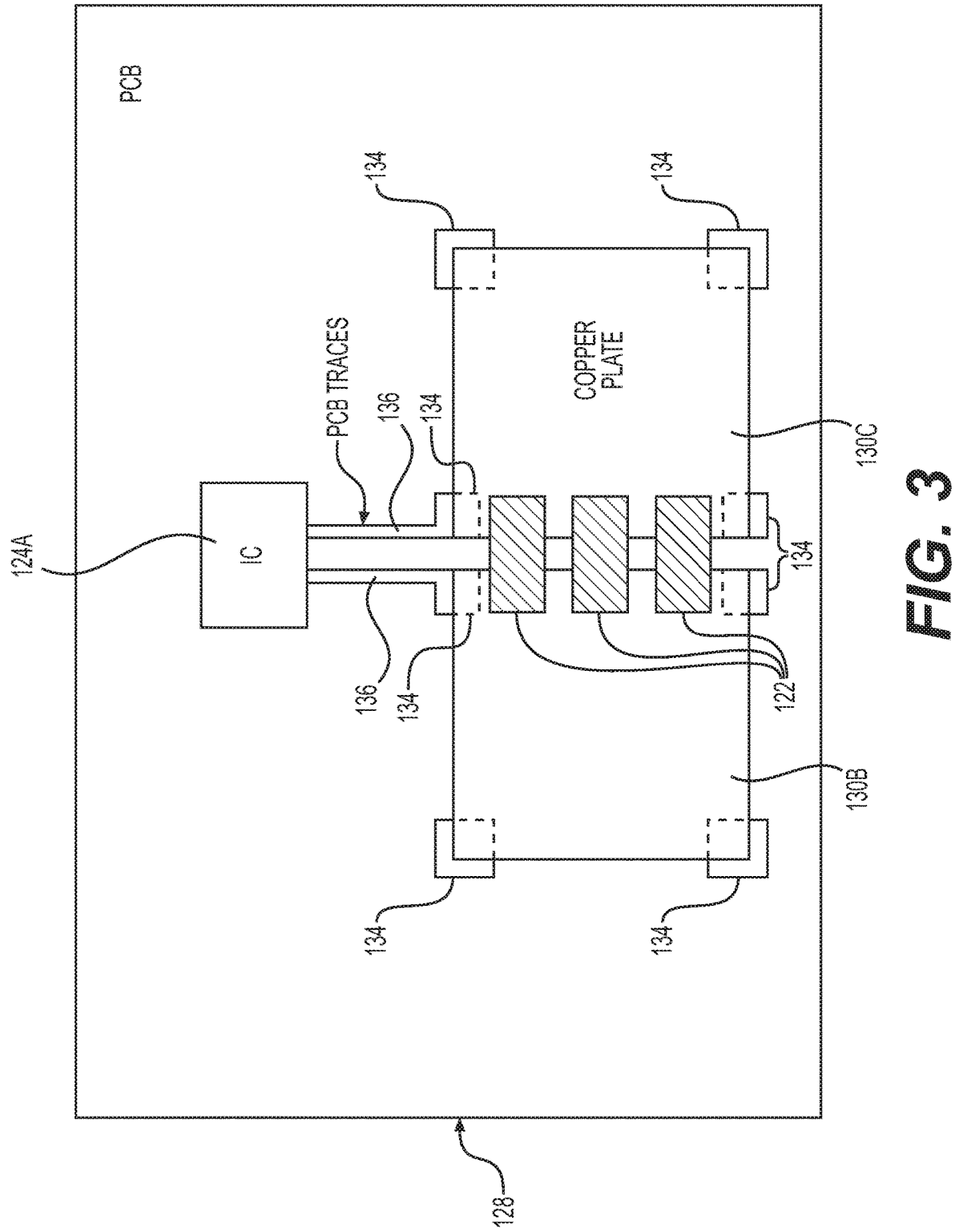
FIG. 3 is a top planar view illustrating the copper plate attachment to the PCB of the BMS.

The structure and arrangement of a portion of the heat sinking Printed Circuit Board (PCB) 128 is shown in FIG. 3. The PCB 128 is provided with electrically conductive metal pads 134 (e.g. square-shaped copper pads) serving as anchoring points, regions, or devices on the PCB 128. The electrically conductive metal pads 134 are located so that the electrically conductive metal plates 130B, 130C can be soldered to connect or install the electrically conductive metal plates 130B, 130C onto the PCB 128. For example, the electrically conductive metal pads 134 are located on the PCB 128 so that the corners of the electrically conductive metal plates 130B, 130C are located (e.g. centered) on the electrically conductive metal pads 134, as shown in FIG. 3. Alternatively, the electrically conductive metal plates can be attached to the electrically conductive metal pads 134 along their edges and/or underneath the electrically conductive metal plates. The electrically conductive metal pads 134 can comprise a single metal layer or multiple metal layers. In some case the BMS PCB can duplicate the PCB electrically conductive metal pads 134 in multiple layers on the PCB, and connect these layers with multiple vias. A via is a drilled and plated hole between layers. The vias provide electrical and thermal conductivity between layers. This provides additional heat spreading and heat sinking to improve thermal performance. Further, the electrically conductive metal pads 134 can be provided with one or more layers of metal plates located between the electrically conductive metal pads 134 and electrically conductive metal plates 130A, 130B, 130C, 130D to enhance heat sinking.

The electrically conductive metal plates 130B, 130C are soldered to the respective electrically conductive metal pads 134. For example, electrically conductive metal pads 134 are provided and located at one or more corners of the electrically conductive metal plates 130A, 130B, 130C, 130D. Alternatively, a single metal pad can be used to attach each electrically conductive metal plate 130A, 130B, 130C, 130D to the PCT 128. For example, single electrically conductive metal pads can each connect each of electrically conductive metal plate 130A, 130B, 130C, 130D to the PCB 128 (i.e. a single metal pad for each electrically conductive metal plate 130A, 130B, 130C, 130D).

A pair of electrical traces 136 electrically connect an integrated circuit (IC) 124A of the BMS controller 124 (FIG. 1) to the electrically conductive metal plates 130B, 130C. The same structure or construction of the portion of the heat sinking PCB 128 also applies to the electrically conductive metal plates 130B, 130D.

Figure 4:
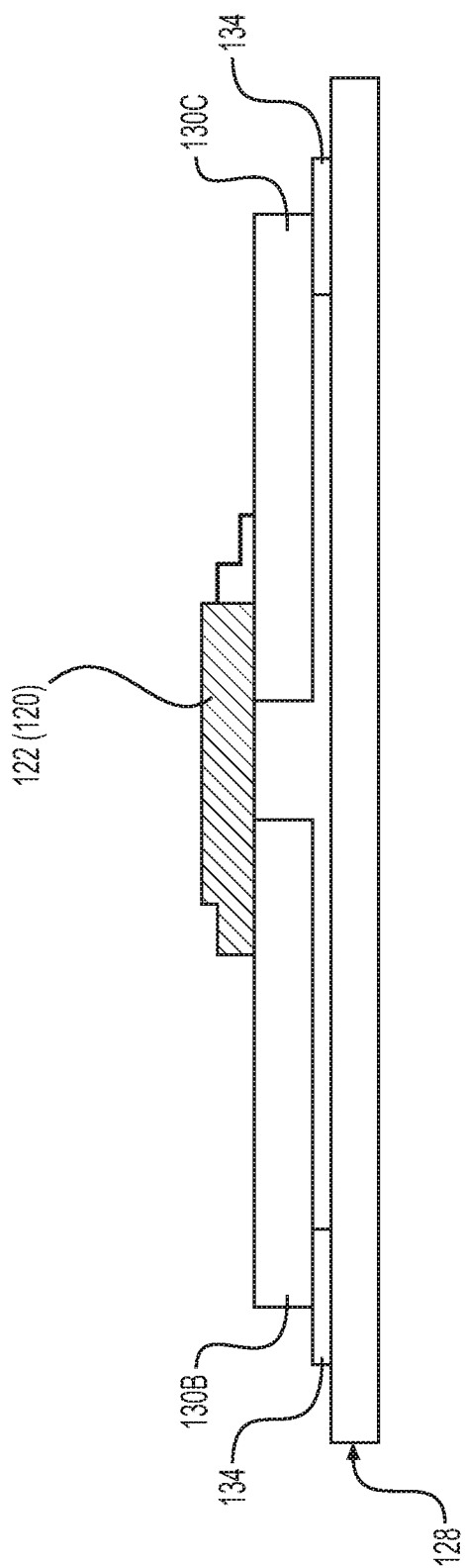
FIG. 4 is a side view of the PCB shown in FIG. 3 illustrating the copper plate attachment for thermal management.
Figure 5:
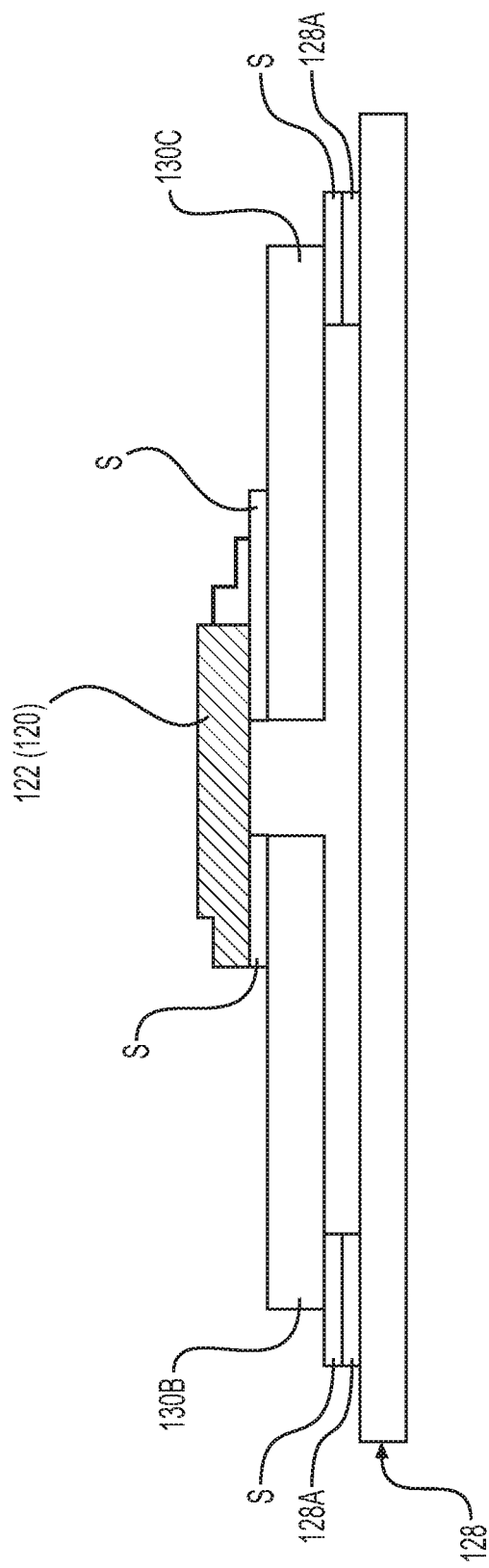
FIG. 5 is a more detailed side view of the PCB of the BMS shown in FIG. 3 also showing the soldered layer of the copper plate attachment.

The MOSFETS 122 and current sense resistors 120 (i.e. electrical components of the BMS) each have spaced apart connectors directly soldered to adjacent pairs of the electrically conductive metal plates 130A, 130B, 130C, 130D, as shown in FIG. 4. Again, the electrically conductive metal plates 130B, 130C are soldered to the respective electrically conductive metal pads 134.

Figure 6:
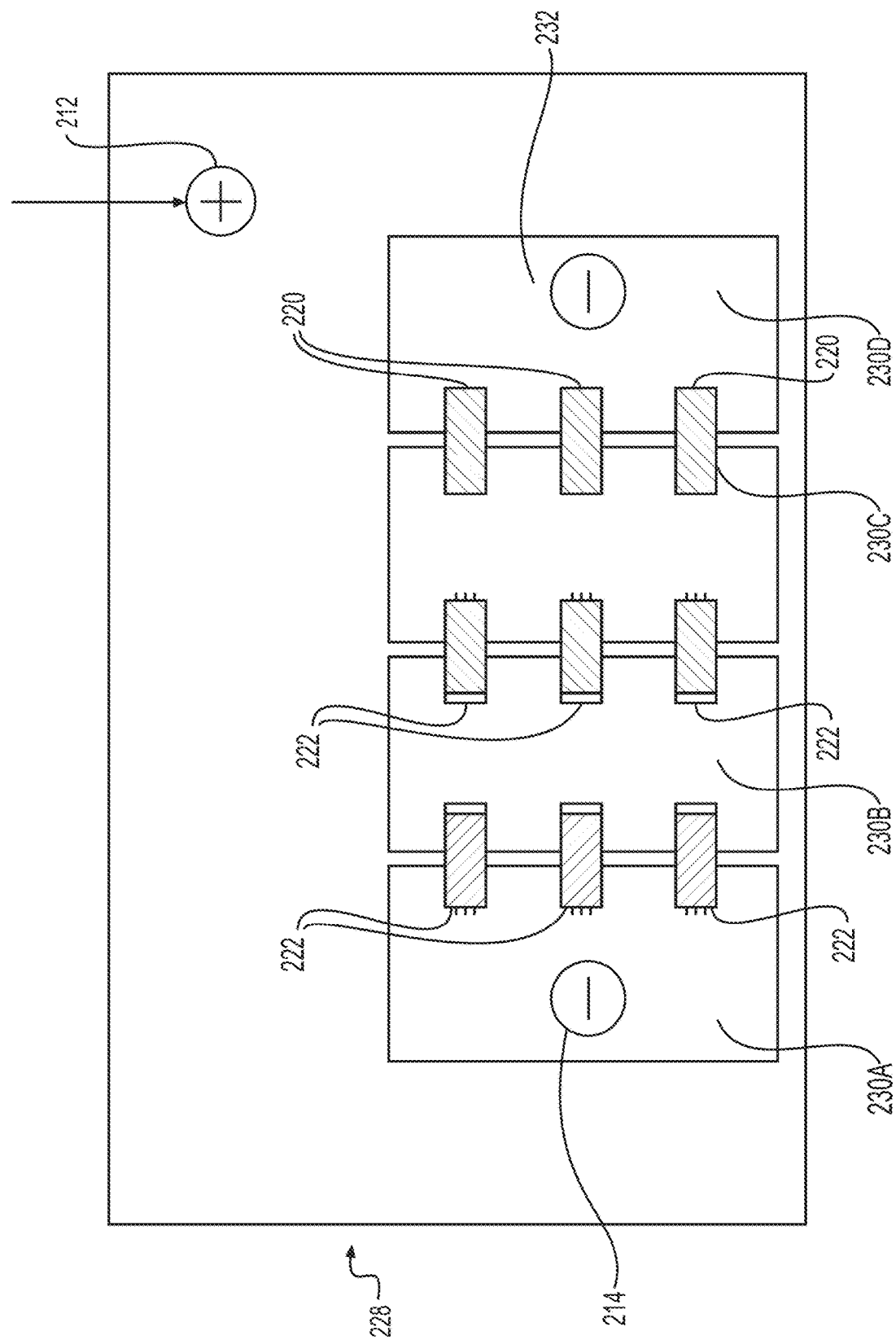
FIG. 6 is a top planar view of another PCB of another BMS with multiple spaced apart copper plates for thermal management according to the present invention. This figure shows a linear layout for the BMS components. This layout is difficult to fit into space constrained applications

Another heat sinking Printed Circuit Board (PCB) 228 according to the present invention is shown in FIG. 6. The PCB 228 comprises a positive (+) battery terminal 212 having a positive (+) red wire connection 212A, a negative (−) battery terminal 214, a first electrically conductive metal plate 230A, a second electrically conductive metal plate 230B, a third electrically conductive metal plate 230C, a fourth electrically conductive metal plate 230D, a BMS negative (−) terminal 232 having a negative (−) black wire connection 232A, multiple MOSFETS 222 (e.g. six (6) MOSFETS with three (3) MOSFETS arranged in parallel with two (2) sets of the MOSFETS arranged in series as shown), and multiple current sense resistors 220. The electrically conductive metal plates 230A, 230B, 230C, 230D, for example, are made of electrically conductive metal or other suitable conductive materials or composites (e.g. copper plate, aluminum plate, nickel plate, silver plate, gold plate, metal clad plate, plated metal plate).

The electrically conductive plates 230A, 230B, 230C, 230D are oriented and spaced apart from each other when assembled onto the PCB 228. For example, the electrically conductive metal plates 230A, 230B, 230C, 230D are copper plates. Further, the electrically conductive metal plates 230A, 230B, 230C, 230D are rectangular-shaped. Alternatively, the electrically conductive metal plates can have other shapes (e.g. square, triangle, round, star, U-shaped, custom shape(s)).

Figure 7:
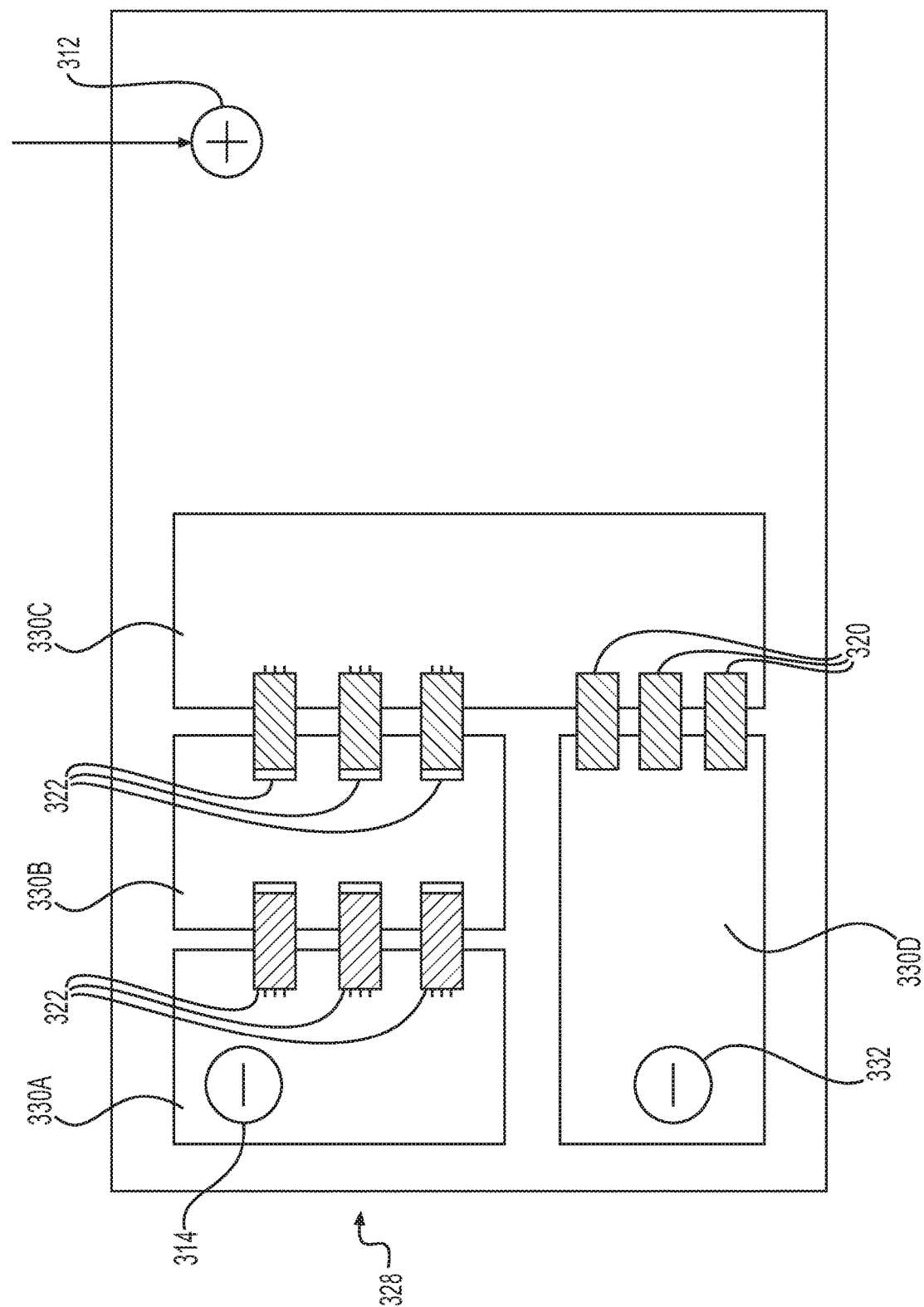
FIG. 7 is a top planar view of a further PCB of a further BMS with multiple spaced apart copper plates for thermal management according to the present invention. This figure shows a modified BMS layout that allows fit into a smaller space, but compromises current sharing.

A further heat sinking Printed Circuit Board (PCB) 328 according to the present invention is shown in FIG. 7. The PCB 328 comprises a positive (+) battery terminal 312 having a positive (+) red wire connection 312A, a negative (−) battery terminal 314, a first electrically conductive metal plate 330A, a second electrically conductive metal plate 330B, a third electrically conductive metal plate 330C, a fourth electrically conductive metal plate 330D, a BMS negative (−) terminal 332 having a negative (−) black wire connection 332A, multiple MOSFETS 322 (e.g. six (6) MOSFETS with three (3) MOSFETS arranged in parallel with two (2) sets of the MOSFETS arranged in series as shown), and multiple current sense resistors 320.

The electrically conductive metal plates 330A, 330B, 330C, 330D, for example, are made of electrically conductive metal or other suitable conductive materials or composites (e.g. copper plate, aluminum plate, nickel plate, silver plate, gold plate, metal clad plate, plated metal plate).

The electrically conductive plates 330A, 330B, 330C, 330D are oriented and spaced apart from each other when assembled onto the PCB 328. For example, the electrically conductive metal plates 330A, 330B, 330C, 330D are copper plates. Further, the electrically conductive metal plates 330A, 330B, 330C, 330D are rectangular-shaped. Alternatively, the electrically conductive metal plates can have other shapes (e.g. square, triangle, round, star, U-shaped, custom shape(s)).

Figure 8:
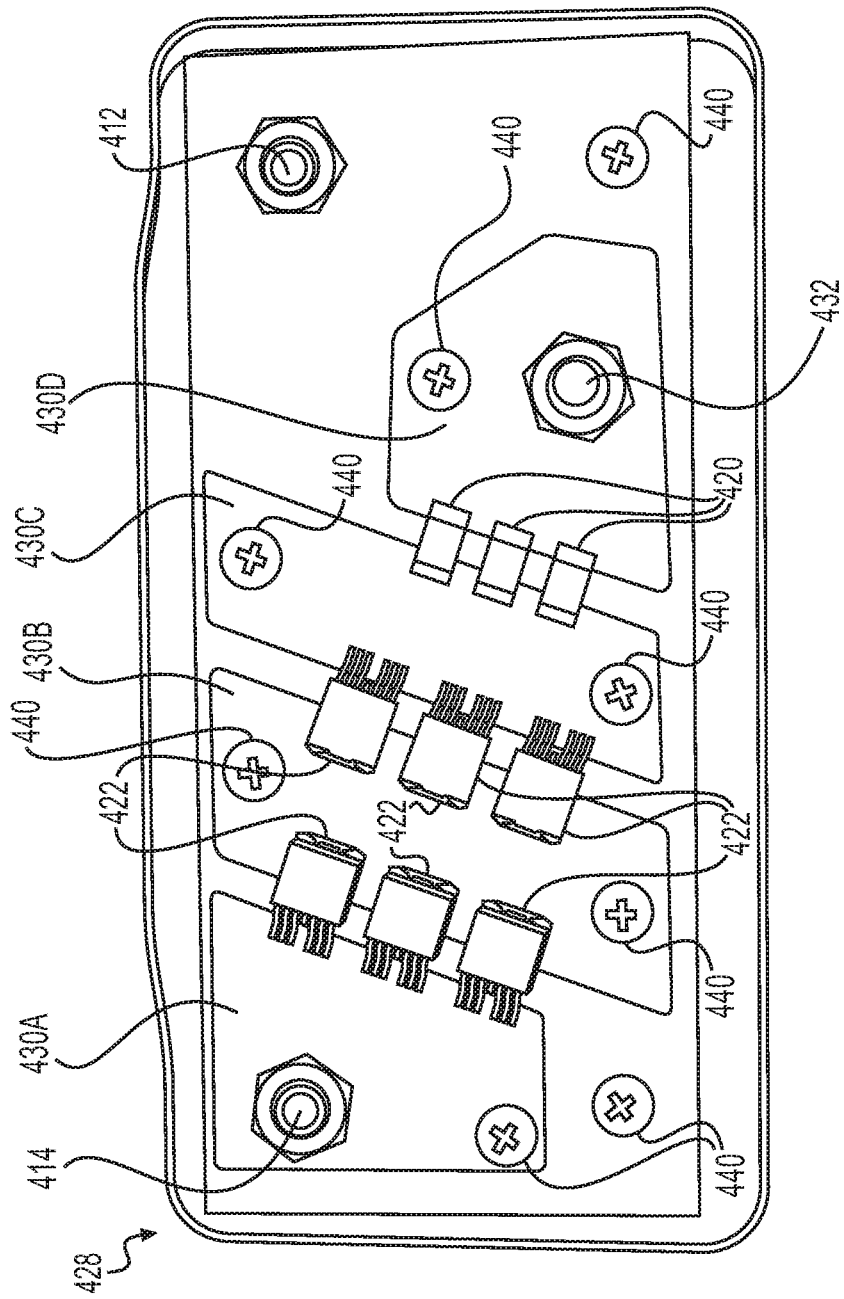
FIG. 8 is a top planar view of an even further BMS having an even further PCB with multiple spaced apart copper plates for thermal management according to the present invention. This figure shows a compact BMS component arrangement. The components are arranged diagonally across the battery to maximize heatsinking area, and ensure equal current sharing. This example is for a negative side BMS, but applies equally to a positive side BMS. This example also shows copper plates used as heatsinking, but applies equally to other heatsinking methods such as PCB copper fills or traces. The diagonal current path through the components (from upper left corner to lower right corner of PCB) provides a current sharing advantage of this arrangement.

An even further heat sinking Printed Circuit Board (PCB) 428 according to the present invention is shown in FIG. 8. The PCB 428 comprises a positive (+) battery terminal 412, a negative (−) battery terminal 414, a first electrically conductive metal plate 430A, a second electrically conductive metal plate 430B, a third electrically conductive metal plate 430C, a fourth electrically conductive metal plate 430D, a BMS negative (−) terminal 432, multiple MOSFETS 422 (e.g. six (6) MOSFETS with three (3) MOSFETS arranged in parallel with two (2) sets of the MOSFETS arranged in series as shown), and multiple current sense resistors 420.

The MOSFETs 422 and current sense resistors 420 are oriented diagonally on the PCB 428. This provides a compact arrangement of the MOSFETs 422 and current sense resistors 420 on the PCB 428.

Further, the electrically conductive metal plates 430A, 430B, 430C, 430D are oriented diagonally relative to the edges of the rectangular-shaped PCB 428. Specifically, a center longitudinal axis of the electrically conductive metal plates 430A, 430B, 430C, 430D are oriented diagonally relative to the edges of the rectangular-shaped PCB 428. Alternatively, or in addition, one or more edges of the electrically conductive metal plates 430A, 430B, 430C, 430D accommodating the MOSFETS 422 and/or current sense resistors 420 are oriented diagonally relative to the edges of the rectangular-shaped PCB 428.

The electrically conductive metal plates 430A, 430B, 430C, and 430D are made of electrically conductive metal or other suitable conductive materials or composites (e.g. copper plate, aluminum plate, nickel plate, silver plate, gold plate, metal clad plate, plated metal plate).

The electrically conductive plates 430A, 430B, 430C, 430D are diagonally oriented and spaced apart from each other when assembled onto the PCB 428. For example, the electrically conductive metal plates 430A, 430B, 430C, 430D are copper plates. Further, the electrically conductive metal plates 430B and 430C are shown as having a trapezoid shape, and electrically conductive metal plates 430A and 430D have multiple sides with at least one diagonally oriented edge 430AA, 430DA oriented along a diagonal relative to edges of the rectangular-shaped PCB 428. Alternatively, the electrically conductive metal plates can have other shapes (e.g. square, rectangle); however, oriented along a diagonal axis relative to edges of the rectangular-shaped PCB 428.

Figure 9:
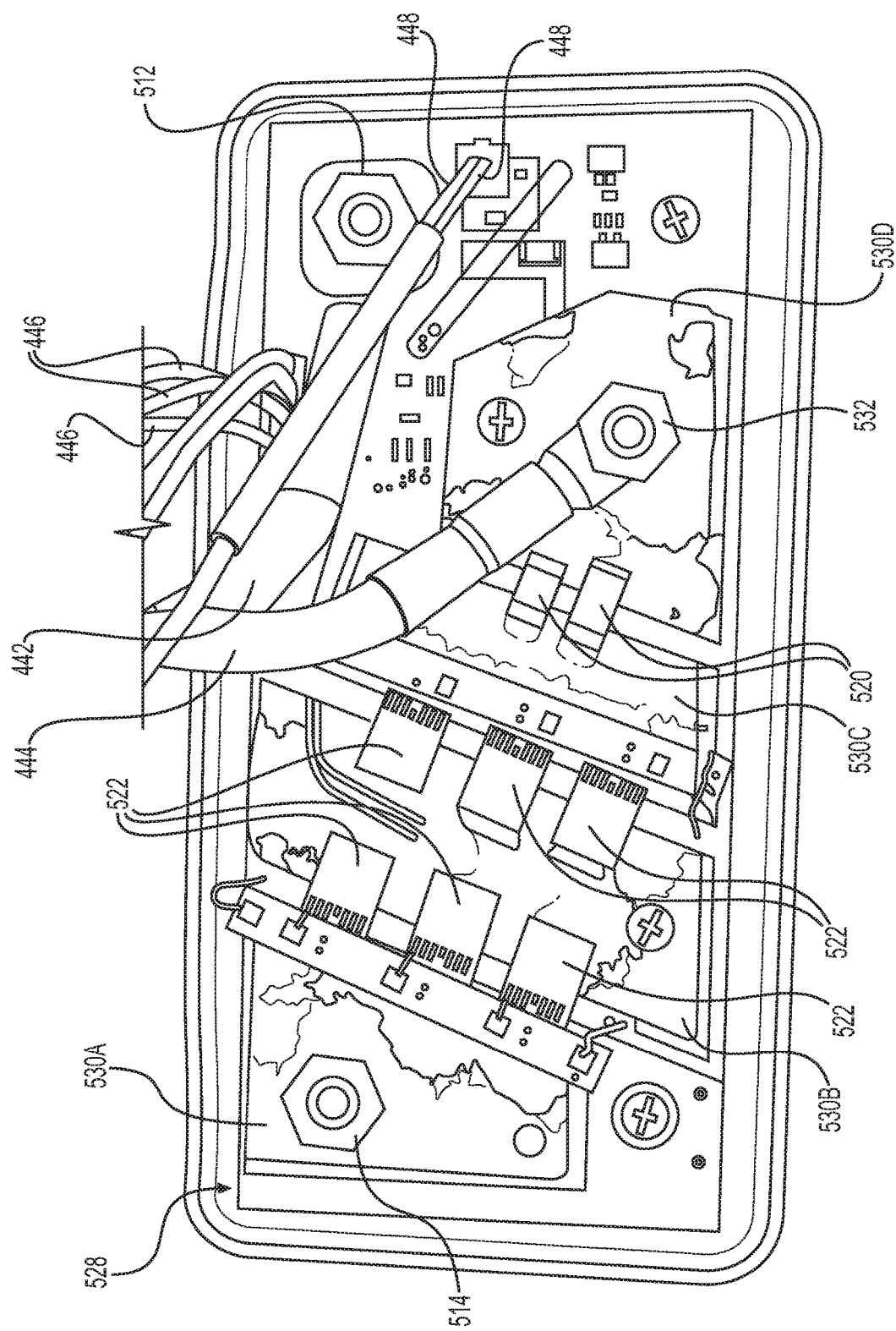
FIG. 9 is a top planar view of the BMS shown in FIG. 8 connected to the positive and negative cables and wiring.

Another heat sinking Printed Circuit Board (PCB) 528 installed within a rechargeable battery according to the present invention is shown in FIG. 9. The PCB 528 comprises a positive (+) battery terminal 512, a negative (−) battery terminal 514, a first electrically conductive metal plate 530A, a second electrically conductive metal plate 530B, a third electrically conductive metal plate 530C, a fourth electrically conductive metal plate 530D, a BMS negative (−) terminal 532, multiple MOSFETS 522 (e.g. six (6) MOSFETS with three (3) MOSFETS arranged in parallel with two (2) sets of the MOSFETS arranged in series as shown), and multiple current sense resistors 520.

The MOSFETs 522 and current sense resistors 520 are oriented diagonally on the PCB 528. This provides a more compact arrangement of the MOSFETs 522 and current sense resistors 520 on the 5CB 428 compared to vertically and/or horizontally oriented arrangements relative to the edges of a rectangular-shaped PCB.

Further, the electrically conductive metal plates 530A, 530B, 530C, 530D are oriented diagonally relative to the edges of the rectangular-shaped PCB 528. Specifically, a center longitudinal axis of the electrically conductive metal plates 530A, 530B, 530C, 530D are oriented diagonally relative to the edges of the rectangular-shaped PCB 528. Alternatively, or in addition, one or more edges of the electrically conductive metal plates 530A, 530B, 530C, 530D accommodating the MOSFETS 522 and/or current sense resistors 520 are oriented diagonally relative to the edges of the rectangular-shaped PCB 528.

The electrically conductive metal plates 530A, 530B, 530C, and 530D are made of electrically conductive metal or other suitable conductive materials or composites (e.g. copper plate, aluminum plate, nickel plate, silver plate, gold plate, metal clad plate, plated metal plate).

The electrically conductive plates 530A, 530B, 530C, 530D are diagonally oriented and spaced apart from each other when assembled onto the PCB 528. For example, the electrically conductive metal plates 530A, 530B, 530C, 530D are copper plates. Further, the electrically conductive metal plates 530B and 530C are shown as having a trapezoid shape, and electrically conductive metal plates 530A and 530D have multiple sides with at least one diagonally oriented edge 530AA, 530DA oriented along diagonal axes relative to edges of the rectangular-shaped PCB 528. Alternatively, the electrically conductive metal plates can have other shapes (e.g. square, rectangle); however, center axis of the plates are oriented along a diagonal axis relative to edges of the rectangular-shaped PCB 528.

A positive cable 442 of the BMS is connected to the positive (+) battery terminal and a negative cable 444 of the BMS is connected to the negative (−) battery terminal. A set of wires 448 connects the PCB 528 to the BMS controller (e.g. BMS controller 24 shown in FIG. 1).

The invention claimed is:

1. A battery management system (BMS) for use in a rechargeable battery, the BMS comprising:
   a printed circuit board (PCB) having two or more diagonally oriented electrically conductive metal plates, the two or more electrically conductive metal plates are located adjacent to and spaced apart from each other on the PCB providing an electrically isolating gap between the two or more electrically conductive metal plates; and one or more electronic components of the BMS electrically connected between the two or more electrically conductive metal plates.

2. The BMS according to claim 1, wherein the PCB is provided with multiple electrically conductive metal pads for attaching or anchoring the two or more electrically conductive metal plates to the PCB.

3. The BMS according to claim 2, wherein the multiple electrically conductive metal pads are formed by etching through a metal layer provided on a substrate of the PCB.

4. The BMS according to claim 2, wherein the multiple electrically conductive metal pads are located on the PCB so that corners of the two or more electrically conductive metal plates connect with the multiple electrically conductive metal pads to secure the two or more electrically conductive metal plates to the PCB.

5. The BMS according to claim 1, wherein the two or more electrically conductive metal plates are arranged in electrical series.

6. The BMS according to claim 1, wherein two or more of the BMS electronic components bridge the electrically isolating gap between the two or more electrically conductive metal plates.

7. The BMS according to claim 6, wherein multiple current sense resistors are connected between another two or more electrically conductive metal plates.

8. The BMS according to claim 1, wherein multiple MOSFETS are connected between the two or more electrically conductive metal plates.

9. The BMS according to claim 8, wherein additional multiple MOSFETS are connected between another set of two or more electrically conductive metal plates.

10. The BMS according to claim 1, wherein multiple current sense resistors are connected between the two or more electrically conductive metal plates.

11. The BMS according to claim 1, wherein the two or more electrically conductive metal plates comprises a first electrically conductive metal plate, a second electrically conductive metal plate, a third electrically conductive metal plate, and a fourth electrically conductive metal plate, and wherein one or more MOSFETS are connected between the first electrically conductive metal plate and the second electrically conductive metal plate, wherein one or more MOSFETS are connected between the second electrically conductive metal plate and the third electrically conductive metal plate, and wherein one or more current sense resistors are connected between the third electrically conductive metal plate and the fourth electrically conductive metal plate.

12. The BMS according to claim 11, wherein multiple MOSFETS are connected between the first electrically conductive metal plate and the second electrically conductive metal plate, wherein multiple MOSFETS are connected between the second electrically conductive metal plate and the third electrically conductive metal plate, and wherein multiple current sense resistors are connected between the third electrically conductive metal plate and the fourth electrically conductive metal plate.

13. The BMS according to claim 11, further comprising a negative battery terminal connected to the first electrically conductive metal plate.

14. The BMS according to claim 13, further comprising a positive battery terminal connected to the PCB.

15. The BMS according to claim 14, further comprising a negative battery terminal connected to the fourth electrically conductive metal plate.

16. The BMS according to claim 15, further comprising a BMS controller is electrically connected to the one or more MOSFETS and the one or more current sense resistors.

17. The BMS according to claim 1, wherein the two or more electrically conductive metal plates are soldered to one or more electrically conductive metal pads of the PCB for securing the two or more electrically conductive metal plates to the PCB.

18. The BMS according to claim 17, wherein the one or more electrically conductive metal pads are made of copper material.

19. The BMS according to claim 17, wherein the one or more electrically conductive metal pads are located on the PCB so that edges of the two or more electrically conductive metal plates connect with the one or more electrically conductive metal pads to secure the two or more electrically conductive metal plates to the PCB.

20. The BMS according to claim 17, wherein the one or more electrically conductive metal pads are located on the PCB so that the two or more electrically conductive metal plates are connected by a lower surface or underneath the two or more electrically conductive metal plates with the one or more electrically conductive metal pads to secure the two or more electrically conductive metal plates to the PCB.

21. The BMS according to claim 17, wherein the one or more electrically conductive metal pads comprise multiple electrically conductive metal layers.

22. The BMS according to claim 17, wherein the one or more electrically conductive metal pads comprise a single metal layer.

23. The BMS according to claim 1, wherein the two or more electrically conductive metal plates are made of copper plate.

24. The BMS according to claim 1, further comprising multiple conductive metal pads connecting the two or more electrically conductive metal plates to the PCB.

25. The BMS according to claim 1, wherein multiple conductive metal pads connect the two or more electrically conductive metal plates to the PCB.

26. The BMS according to claim 25, wherein one or more vias are provided to electrically and thermally connect multiple layers on the PCB.

27. The BMS according to claim 1, wherein multiple electrically conductive metal pads connect to one or more other electrical components or electrical circuits of the PCB of the BMS.

28. The BMS according to claim 1, wherein multiple electrically conductive metal pads are electrically isolated on the PCB of the BMS and provide only mechanical anchoring of the two or more electrically conductive metal plates.

29. The BMS according to claim 1, wherein the two or more diagonally oriented electrically conductive metal plates each have a center axis diagonally oriented relative to edges of the PCB.

30. The BMS according to claim 1, wherein the two or more diagonally oriented electrically conductive metal plates each have one or more diagonally oriented edges accommodating the one or more electronic components of the BMS.

31. A battery management system (BMS) for use in a rechargeable battery, the BMS comprising:
a printed circuit board (PCB) having two or more electrically conductive metal plates, the two or more electrically conductive metal plates are located adjacent to and spaced apart from each other on the PCB providing an electrically isolating gap between the two or more electrically conductive metal plates; and multiple electronic components of the BMS electrically connected between the two or more electrically conductive metal plates, the multiple electronic components are arranged along at least one diagonally oriented axis of the PCB relative to an edge of the PCB.

32. A battery management system (BMS) for use in a rechargeable battery, the BMS comprising:

a printed circuit board (PCB) having two or more electrically conductive metal plates, the two or more electrically conductive metal plates are located adjacent to and spaced apart from each other on the PCB providing an electrically isolating gap between the two or more electrically conductive metal plates, the two or more electrically conductive metal plates each have a diagonally oriented edge along the electrically isolating gap; and multiple electronic components of the BMS electrically connected between the two or more electrically conductive metal plates, the multiple electronic components are arranged along the diagonally oriented axes of the two or more electrically conductive metal plates and bridging the electrically isolating gap between the two or more electrically conductive metal plates.

33. A printed circuit board (PCB) for use in a battery management system (BMS) of a rechargeable battery, the PCB comprising:

two or more electrically conductive metal plates connected to the PCB, the two or more electrically conductive metal plates are located adjacent to and spaced apart from each other on the PCB providing an electrically isolating gap between the two or more electrically conductive metal plates; and multiple electronic components of the BMS electrically connected between the two or more electrically conductive metal plates, the multiple electronic components are arranged along at least one diagonally oriented axis of the PCB relative to an edge of the PCB.

34. A printed circuit board (PCB) for use in a battery management system (BMS) of a rechargeable battery, the BMS comprising:

two or more electrically conductive metal plates connected to the PCB, the two or more electrically conductive metal plates are located adjacent to and spaced apart from each other on the PCB providing an electrically isolating gap between the two or more electrically conductive metal plates, the two or more electrically conductive metal plates each have a diagonally oriented edge along the electrically isolating gap; and multiple electronic components of the BMS electrically connected between the two or more electrically conductive metal plates, the multiple electronic components are arranged along the diagonally oriented axes of the two or more electrically conductive metal plates and bridging the electrically isolating gap between the two or more electrically conductive metal plates.

35. A method of making a printed circuit board for use in a battery management system (BMS), the method comprising:

applying two or more spaced apart electrically conductive metal plates to a printed circuit board (PCB);

diagonally orienting adjacent and spaced apart respective edges of the two or more electrically conductive metal plates on the PCB; and connecting one or more electrical components of the BMS bridging the spaced apart respective edges of the two or more electrically conductive metal plates.

36. A Li-ion battery, comprising:

one or more Li-ion battery cells; and a battery management system (BMS) connect in electrical series with the one or more Li-ion battery cells, the BMS comprising:

a printed circuit board (PCB) having two or more spaced apart electrically conductive metal plates, the two or more electrically conductive metal plates having respective diagonally oriented spaced apart edges; and one or more electronic components of the BMS bridging the respective diagonally oriented spaced apart edges.

* * * * *